United States Patent [19]

Clarke et al.

[11] Patent Number: 4,835,722

[45] Date of Patent: May 30, 1989

[54] CURVE GENERATION IN A DISPLAY SYSTEM

[75] Inventors: David A. Clarke; Robert W. E. Farr, both of Eastleigh, England

[73] Assignee: International Business Machines Corporation, Armonk, N.Y.

[21] Appl. No.: 118,597

[22] Filed: Nov. 9, 1987

[30] Foreign Application Priority Data

Jul. 23, 1987 [GB] United Kingdom ................. 8710325

[51] Int. Cl.[4] ................................................ G06F 1/02

[52] U.S. Cl. ..................................... 364/720; 364/521

[58] Field of Search ......... 364/720, 718, 518, 521-522

[56] References Cited

U.S. PATENT DOCUMENTS

| | | | |
|---|---|---|---|
| 3,917,932 | 11/1975 | Saita et al. | 364/720 X |
| 4,115,863 | 9/1978 | Brown | 364/521 |
| 4,272,808 | 6/1981 | Hartwig | 364/718 |
| 4,314,351 | 2/1982 | Postel et al. | 364/720 |
| 4,484,298 | 11/1984 | Inoue et al. | 364/720 |
| 4,692,887 | 9/1987 | Hashidate | 364/720 |
| 4,744,047 | 5/1988 | Okamoto et al. | 364/900 |
| 4,760,548 | 7/1988 | Baker et al. | 364/718 |

OTHER PUBLICATIONS

"A Linear Algorithm for Incremental Digital Display of Circular Arcs", Bresenham, Communications of the ACM, Feb. 1977, vol. 20, No. 2, pp. 100–106.

Fundamentals of Interactive Computer Graphics, Foley et al., pp. 442–446.

*Primary Examiner*—Gary V. Harkcom
*Assistant Examiner*—Tan V. Mai
*Attorney, Agent, or Firm*—Mark S. Walker; J. Dennis Moore

[57] ABSTRACT

A curve generator for a display system with an arc generator has for generating an arc (10) of a circle (14) from data defining the locations of two end points $P_1$ and $P_3$ and an intermediate point $P_2$ on the arc. The arc generator has an initializer (40) for calculating the angle subtended between a first vector (21), from a first of the end points, $P_1$ to the intermediate point $P_2$, and a second vector (32), from the second of the end points $P_3$ to the intermediate point $P_2$, and an arc plotter (44) for defining a succession of further vectors n1 from the first end point $P_1$ and for calculating, for each further vector, its point of intersection $P_n$ with a counterpart vector 3n, from the second end point $P_3$, with which it subtends the same angle, whereby a succession of further points $P_n$ are plotted on the circular arc.

7 Claims, 6 Drawing Sheets

CURVE GENERATION IN A DISPLAY SYSTEM

BACKGROUND OF THE INVENTION

1. Field of the Invention

The present invention relates to a curve generator for a display system, to a display system including such a generator and to methods of generating curves in a display system.

2. Background Art

To generate curves such as an arc of a circle from data defining the arc is a non-trivial task in a computer due to the significant calculations involved.

A circle centered at the origin of a coordinate system can be defined by the following, well known, equation:

$$x^2+y^2=R^2 \tag{1}$$

where x and y are the variable horizontal and vertical coordinates of the coordinate system, and R is the radius of the circle.

Solving this equation for y gives:

$$y=\pm(R^2-x^2)^{\frac{1}{2}} \tag{2}$$

A simple approach to drawing one quadrant of a circle using this equation is to increment x in unit steps from O to R solving for +y at each of the steps. The other three quadrants of the circle can then be determined about the origin using the symmetry of the circle. Although this technique works, it is inefficient because of the multiply and square root operations.

A similarly inefficient method is simply to plot R cos $\theta$ or R sin $\theta$ by stepping $\theta$ from 0° to 90°, and then generating the other three quadrants using the symmetry of the circle.

An improved method of generating a circular arc is described in J. E. Bresenham's article "A Linear Algorithm for Incremental Digital Display of Circular Arcs" published on pages 100–106 of "Communications of the ACM", Vol. 20, No. 2, in February 1977. This method, which is based on equation (1) above, was conceived for use with pen plotters, although it is applicable generally to pixel based display systems.

In accordance with the method, points on a circle centered at the origin are generated by stepping round the circle. At each step the pixel point which is closest to the true circle is selected for display by employing an error term:

$$D\ (Pt_i)=(x^2_i+y^2_i)-R^2 \tag{3}$$

where $D(Pt_i)$ is the difference between the true circle for the ith point ($Pt_i$) and $x_i$ and $y_i$ are the x and y values calculated for the ith point.

References to these and to many other techniques can be found in Foley and Van Dam's book "Fundamentals of Interactive Computer Graphics" (published in 1982 by Addison-Wesley Publishing Company), on pages 442–446.

In theory the prior technique work well, although with varying degrees of efficiency. They are designed essentially to draw complete circles, although they can of course be used to draw an arc of a circle. In practice, however, when implemented in a graphics processing system, severe limitations as to their applicability to the drawing of arcs are encountered. In particular, the prior techniques run into difficulty in accurately plotting an arc which forms part of a very large circle where only part of the circle is within the system coordinate space.

This results primarily from the need to compute, either explicitly or implicitly, the actual center of the circle of which the arc forms part. If an arc is to be drawn which is almost a straight line, it will be appreciated that a very large number will be needed to define the radius of circle of which it forms part, as the center of the circle may be well outside the bounds of the coordinate space within which the arcs are to be generated.

SUMMARY OF THE INVENTION

In accordance with a first aspect of the present invention there is provided, a curve generator for a display system, the curve generator comprising arc generation means for generating an arc of a circle from data defining the locations of two end points and an intermediate point on the arc, wherein the arc generation means comprises initialization means for calculating the angle subtended between a first vector, from a first of the end points of the intermediate point, and a second vector, from the second of the end points to the intermediate point, and arc plotting means for defining a succession of further vectors from said first end point and for calculating, for each further vector, its point of intersection with a counterpart vector, from said second end point, with which it subtends said angle, whereby a succession of further points are plotted on the circular arc.

In accordance with a second aspect of the present invention there is provided, a method of generating an arc of a circle in a display system comprising processing and memory means from data defining the locations of two end points and an intermediate point on the arc comprising the steps of:

(a) calculating the angle subtended between a first vector, from a first of the end points to the intermediate point, and a second vector, from the second of the end points to the intermediate point;

(b) storing the calculated angle in said storage means;

(c) defining a further vector from said first end point;

(d) calculating, for said further vectors, its point of intersection with a counterpart vector, from the second end point, with which it subtends said calculated angle; and (e) repeating steps (c) and (d) for yet further vectors from said firs end point whereby a succession of further points are plotted on the circular arc.

The present invention is based on the well known theorem in geometry which states that for a triangle with vertices $P_1$, $P_2$ and $P_3$ inscribed on a circle radius R:

$$A/\mathrm{Sin}\ (a)=B/\mathrm{Sin}\ (b)=C/\mathrm{Sin}\ (c)=2R \tag{4}$$

where a, b and c are the interior angles subtended at the vertices $P_1$, $P_2$ and $P_3$ respectively and A, B, and C are the lengths of the sides opposite to the vertices $P_1$, $P_2$ and $P_3$ respectively.

Although this theorem is featured in good school textbooks in geometry, its application to solving the problem of arc generation in computers has not heretofore been recognized despite the extensive efforts in the art to improve the performance of arc generators.

The advantages of the present invention result primarily from the fact that the computation of the points of the arc is not performed with respect to the center of the circle of which the arc forms part. The points on the arc are plotted instead with respect to a given point on the arc itself by generating vectors from that given point. The present invention thus enables the computation of the arc to be performed substantially within the system coordinate space in which the arc exists, which reduces the number of places of accuracy needed in order to accurately compute the arc. In addition, the present invention has the advantage that the computation of the arc can be performed in integer arithmetic, which enhances the performance of the arc generator.

BRIEF DESCRIPTION OF THE DRAWINGS

In order that the present invention may be more fully appreciated, there follows a description of the principles behind the present invention and of particular embodiments of the invention with reference to the accompanying drawings in which.

DETAILED DESCRIPTION OF THE PREFERRED EMBODIMENTS

Before dealing with the embodiments of the present invention, the principles on which the present invention is based will be explained in the following.

Let us assume that an arc is defined in three dimensional (x, y, z) coordinate space in terms of the two end points of the arc and a third point which lies on the arc intermediate to the end points.

Figure 1:
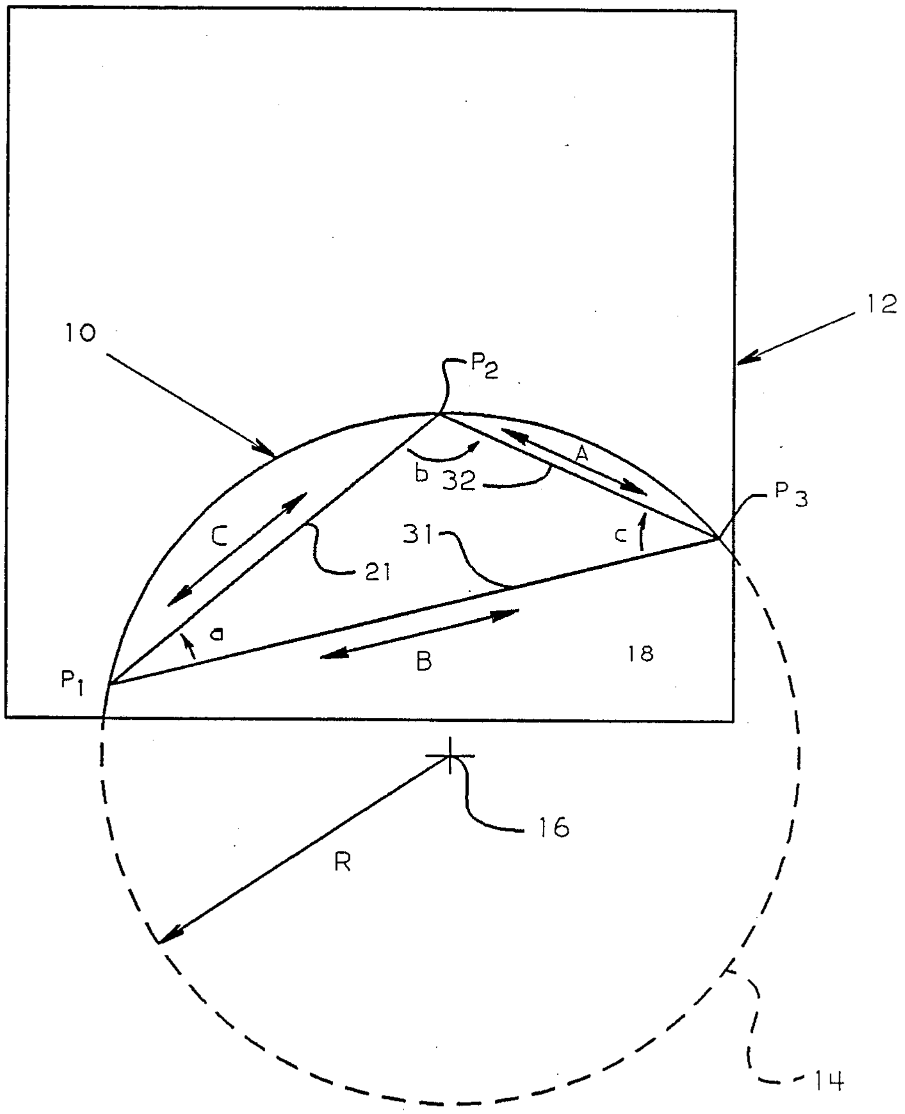
FIG. 1 is an illustration, used to explain the principles of operation of the present invention, of an arc to be drawn within a rectangular coordinate space.

FIG. 1 illustrates an example of such an arc 10 within a coordinate space 12. For reasons of ease of illustration only, a two dimensional (x and y) coordinate space is shown, although it will be apparent from the following description that the treatment of the two-dimensional case can easily be expanded to three-dimensional (x, y, z) space.

The arc 10 forms part of a circle 14 of radius R, the center 16 of which lies outside the coordinate space 12 in the illustrated example. The arc 10 is defined in terms of the coordinates $(x_1, y_1)$ of a first end point $P_1$ of the arc, the coordinates $(x_3, y_3)$ of a second end point $P_3$ of the arc and the coordinates $(x_2, y_2)$ of a third point $P_2$ which lies on the arc.

The three points $P_1$, $P_2$, and $P_3$ can be considered to form respectively first, second and third vertices of a triangle 18. FIG. 1 shows the interior angles subtended at the three vertices $P_1$, $P_2$ and $P_3$ to have the values a, b and c respectively and the sides 32, 31, 21 of the triangle to have the lengths A, B and C respectively.

Equation (4) above applies to any triangle inscribed on a circle. Thus the following equation applies to triangle 20, shown in FIG. 2, which comprises vertices $P_1$, $P_3$ and $P_n$ inscribed on the circle 14, the interior angles subtended at the vertices $P_1$, $P_3$ and $P_n$ being respectively $a_n$, $b_n$ and $c_n$ at the lengths of the opposite sides 3n, 31, n1 being respectively $A_n$, $B_n$ and $C_n$:

$$A/\sin(a_n) = B/\sin(b_n) = C/\sin(c_n) = 2R \quad (5)$$

As the points $P_1$ and $P_3$ of the triangle 20 are common to the triangle 18, it follows that the length of the side 31 joining those points will have the length B for both triangles. Thus it follows that for any triangle formed from points $P_1$ and $P_3$ and a third point $P_n$ on the arc, on the arc, the interior angle $b_n$ is constant i.e.:

$$b_n = b = \arcsin(B/2R) \quad (6)$$

Given that the sum of the interior angles of a triangle is $\pi$ radians, and that a straight line through a point subtends $\pi$ radians about that point, it can be shown by the following that the angle $\delta_n$ subtended between a tangent 24 to the circle 14 at the point $P_1$ and the line n1 joining points $P_1$ and $P_n$ of the triangle 20 will be equal to the interior angle $C_n$ subtended at the vertex $P_3$ of that triangle 20. That is:

$$\pi = t + \delta_n + a_n; \text{ and} \quad (7)$$

$$\pi = b + a_n + c_n. \quad (8)$$

$$\delta_n = \pi - t - (\pi - b - c_n) = +b + c_n - t \quad (9)$$

As $P_n \rightarrow P_1 \delta_n \rightarrow 0$ and $c_n \rightarrow 0$.

Thus t=b, both being constants, and $$\delta_n = c_n \quad (10)$$

From equations (5) and (10) it can be seen that the length of the side n1 of the triangle 20 opposite the vertex $P_3$ is:

$$C_n = \frac{B|\sin(\delta_n)|}{|\sin(b)|} \quad (11)$$

If, then, an angle dir is defined as the angle subtended by the line n1 and the x coordinate axis (i.e. the gradient of that line), the following equation can be used to compute dir:

$$\begin{aligned} \text{dir} &= \pi - \delta_n - t + g_{31} \\ &= \pi - \delta_n - b + g_{31} \end{aligned} \quad (12)$$

where $g_{31}$ is the angle of the line 31 to the x axis (i.e. $g_{31}$ is the gradient of that line).

Using equations (11) and (12), it is then possible to calculate the $x_n$ and $y_n$ coordinates of the point $P_n$ by evaluating the following expressions:

$$\begin{aligned} x_n &= x_1 + C_n \cos(\text{dir}) \\ &= x_1 + \frac{B|\sin(\delta_n)|}{|\sin(b)|} \cos(\text{dir}) \end{aligned} \quad (13)$$

and $$\begin{aligned} y_n &= y_1 + C_n \sin(\text{dir}) \\ &= y_1 + \frac{B|\sin(\delta_n)|}{|\sin(b)|} \sin(\text{dir}) \end{aligned} \quad (14)$$

Figure 3:
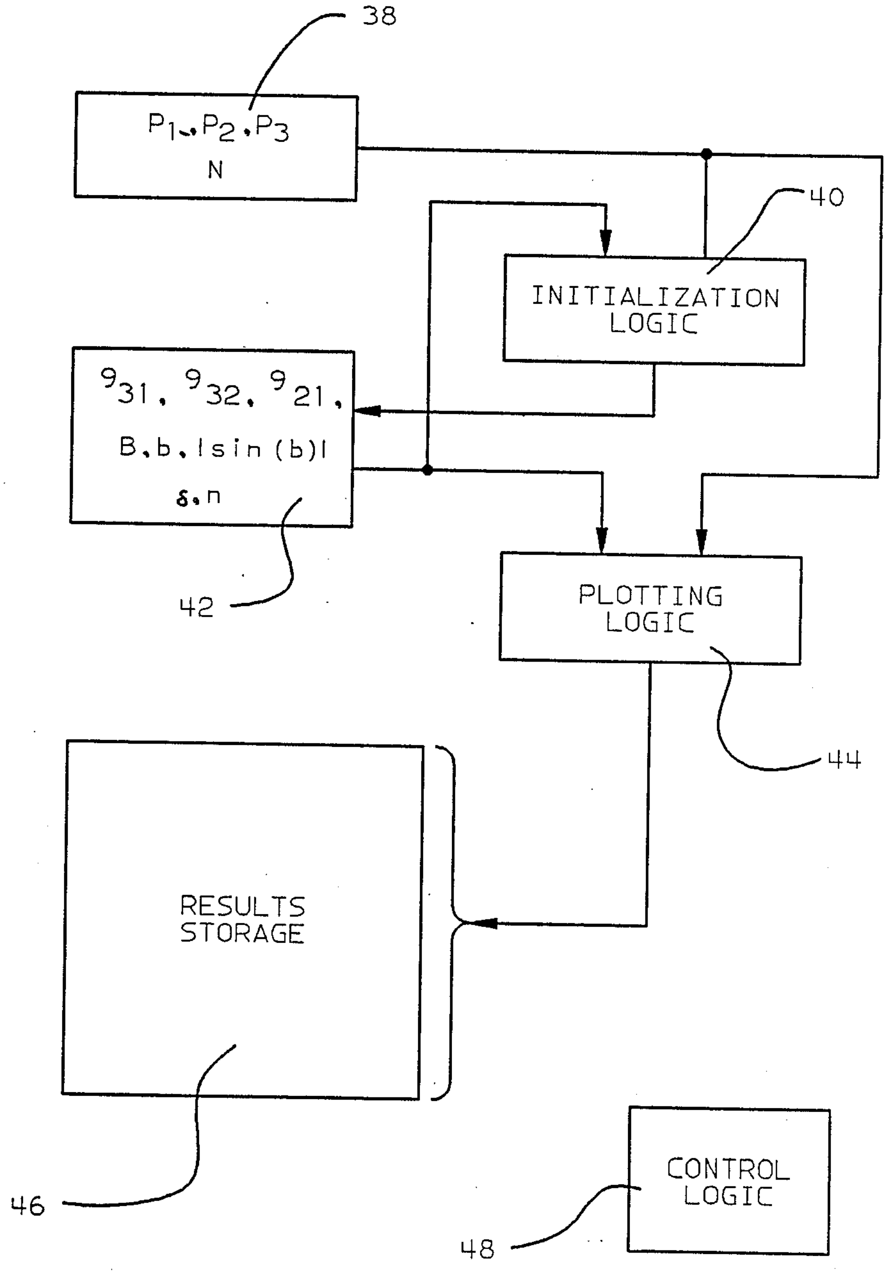
FIG. 3 is a schematic block diagram showing the logical structure of a particular embodiment of the present invention.

FIG. 3 is a schematic block diagram showing the logical structure of an arc generator forming a particular embodiment of the present invention. Only those parts of the arc generator which are necessary for explaining the present invention are shown in FIG. 3. The arc generator would normally be incorporated in a display system (e.g. a graphics workstation) of an otherwise conventional construction (see for example FIG. 6).

Initialization logic 40 computes a number of initialization values from the coordinate positions of the points $P_1$, $P_2$ and $P_3$ stored in input storage 38. The input storage can be part of the general purpose memory of a display system, or an input buffer or input registers, or, actually part of the arc generator. The coordinate positions can have been generated in a display system in response to positions indicated on the screen of a display system by mouse movements or have been generated in any other suitable way. As the initialization values are calculated by the initialization logic they are stored in the intermediate storage 42. The intermediate storage can be formed from dedicated registers, or can be configured in general purpose storage.

The gradient or slope $g_{31}$ of the line 31 joining $P_3$ and $P_1$ is computed from the coordinate values for those points:

$$g_{31}=\arctan((y_3-y_1)/(x_3-x_1)) \quad (15)$$

The gradients ($g_{32}$ and $g_{21}$) for the lines 32 and 21 are similarly computed.

From the gradients of the sides 32 and 21, stored in the intermediate storage 42, the integral angle b subtended at the point $P_3$ and the absolute value of the sine of that angle are then computed as:

$$b=g_{32}-g_{21} \quad (16)$$

$$|\sin(b)|=|\sin(g_{32}-g_{21})| \quad (17)$$

The length (B) of the line 31 joining points $P_1$ and $P_3$ is also computed as:

$$B=|(x_3-x_1)\cos(g_{31})| \quad (18a)$$

$$\text{or } B=|(y_3-y_1)\sin(g_{31})| \quad (18b)$$

The choice of sin or cos for the calculation of B depends on whether the angle $g_{31}$ is greater than, or less than $\pi/4$ in order to minimize errors.

A stepping angle $\delta$ is also computed in order to determine the angle to be swept between successive points on the arc. This can be computed on the basis of $\delta=(\pi+b)/N$ where the number N is chosen to give a desired density of points for the arc. The number N can also be provided as an input from the input storage 38, or elsewhere as desired. It could also be calculated as a function of a desired resolution.

Once the initialization values have been computed and stored in the intermediate storage 42, the individual points on the arc can be plotted by plotting logic 44.

Figure 2:
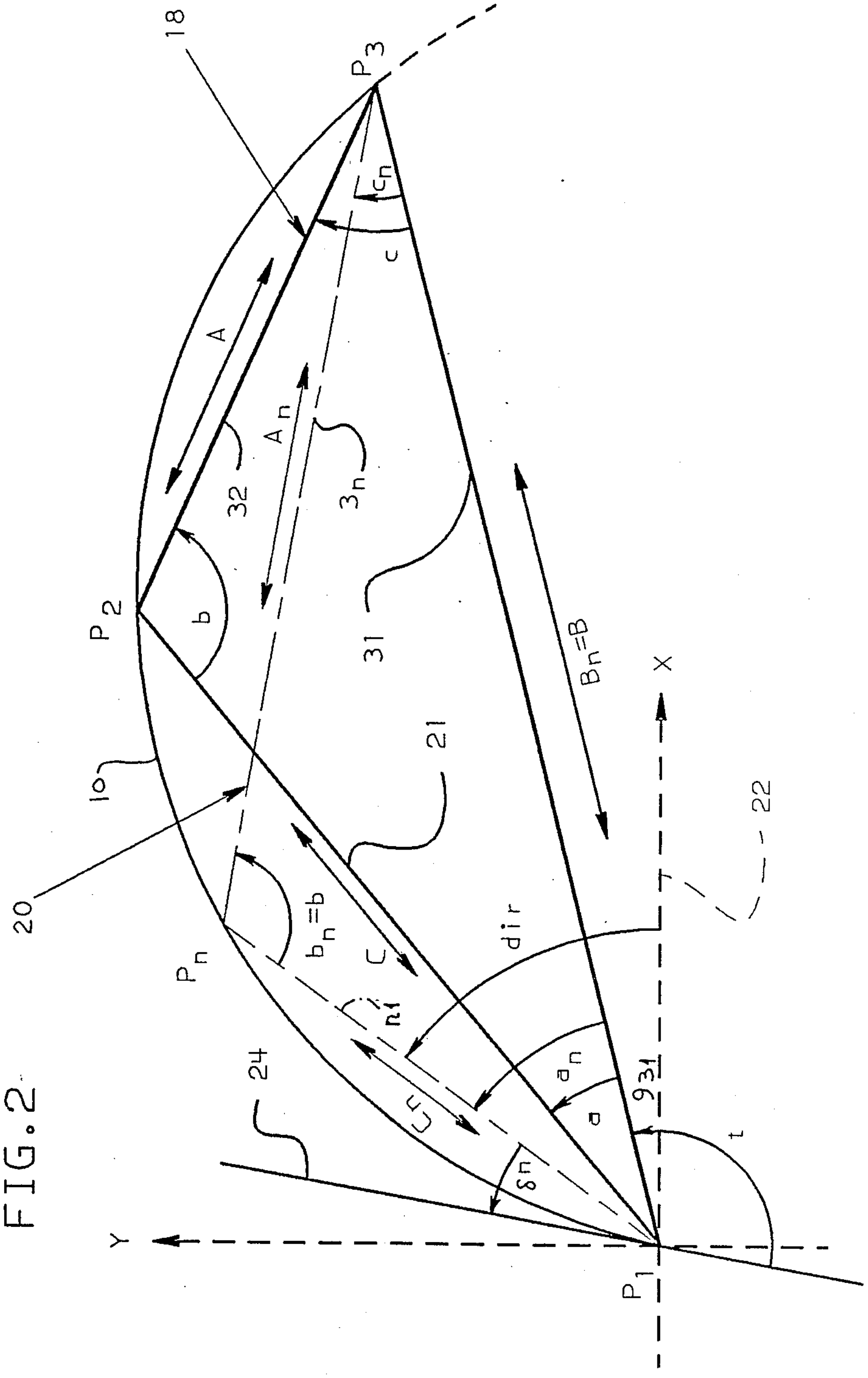
FIG. 2 is a further illustration, used to explain the principles of operation of the present invention.

The plotting logic defines a succession of further vectors from the first point in terms of a vector angle $\delta_n=n\delta$ where $\delta_1=\delta$ for the first vector, $\delta_n=n\delta$ for the nth vector until $\delta_{N-1}=(N-1)\delta$ for the N−1th vector. As is illustrated in FIG. 2, the angle $\delta_n$ is the angle between the tangent t to the circle and the vector in question. By incrementing n from 1 to N−1 the plotting logic sweeps out the arc from one of the points of the arc (e.g. the first) rather than, as is one by the prior methods, from the center of the circle. The x and y values of the end points of the arc $P_1$ and $P_3$ are given for n=O and n=N respectively.

The plotting logic determines the intersection point of each of the vectors with a counterpart vector from the third point, with which it intersects at the angle b, stored in the intermediate storage. The plotting logic does this, not by defining a set of vectors from the third point, but by evaluating equations (13) and (14) for each of the vectors from the first point using the values stored in the intermediate storage. The end points of the arc are defined by the points $P_1$ and $P_3$.

The equations (13) and (14) can be simplified for certain special cases as is explained below and the plotting logic contains specific logic for detecting these special cases.

When the three points are nearly in a straight line, the angle B will approximate $\pi$. Thus, if on testing the value of B it is found to be within $2^{-12}$ of $\pi$ (the precise number depends on the required precision of the calculations), then the relationships $b=N\delta$, $b=\sin(b)$ and $\delta_n=\sin\delta_n$ can be used to simplify equation (13) to $$x_n=x_1+(nB)/(N\cos(dir)) \quad (19)$$

and equation (14) to $$y_n=y_1+(nB)/(N\sin(dir)). \quad (20)$$

If the angle B is found to be less than $2^{-16}$ radians (the precise number depends on the required precision of the calculations), then the two end points are nearly identical and the relationships $2R=B/\sin(b)=m$, where m is a constant, and $m=(x_2-x_1)/\cos(g_{21})$ or $m=(y_2-y_1)/\sin(g_{21})$ can be used to simplify equation (13) to $$x_n=x_1+(m|\sin(\delta_n)|\cos(dir)) \quad (21)$$

and equation (14) to $$y_n=y_1+(m|\sin\delta_n|\sin(dir)). \quad (22)$$

It should be noted that if B is found to be zero, then the two end points of the arc are identical and an arc cannot then be drawn as there is no orientation information.

The calculation of the values above can be performed using integer arithmetic. Not only does this give a significant performance advantage over floating point arithmetic, but it also has the advantage that on overflow during binary integer arithmetic, the sign changes which occur mirror the sign changes for angle. This greatly simplifies the sign (+/−) management. The various trigonometric functions which are required can conveniently be provided using lookup tables in the plotting logic. The trig tables could, alternatively be provided in the control logic, which is responsible for the overall control of the arc generation, or elsewhere. Another advantage of the use of binary arithmetic is that the values resulting from evaluating the equations 13/14 etc. can be mapped onto individual display positions (pixels) by the plotting logic clipping the binary number at an appropriate accuracy. In the same way, intermediate points on the arc which fall outside the coordinate space may simply be discarded by clipping.

The results of the calculations (i.e the plots for the arc) are stored in results storage 46. The results storage shown in FIG. 3 is the display buffer of the display system, and as such does not form part of the arc generator. The output of the plotting logic (i.e. the clipped values) is (are) used to address the display buffer for storing data indicative of pixels to be displayed on a display screen. This need not be the case however, and the results storage could instead form part of general storage, or may even form part of the arc generator itself, in which case the output of the display plotting logic would be merely stored therein for further processing.

Although this particular embodiment of the present invention uses the equations 13/14 etc. to evaluate the appropriate intersection points, it will be understood that an alternative embodiment of the present invention could in fact find a point on the arc by defining a vector from the first point which is rotated from the vector 21 by a given amount, defining a vector from the third point which is rotated by the same amount from the vector 32, and then determining the intersection point of those vectors. A set of points on the arc could then be plotted by repeating this process for different degrees of rotation. This works because the interior angle at the point of intersection remain constant due once more to the fact that the interior angle of a triangle add up $\pi$ radians.

The techniques described above can be used, not only to generate the arc of a circle, but also to generate any other curve for which a transform operator is known for mapping the curve onto a circular arc. For example, in the Graphics Object Content Architecture (GOCA) which forms a particular part of the Systems Network Architecture (SNA), for defining graphics objects, part of an ellipse in real, or reference space, is defined in elliptical space as the corresponding arc of a circle in terms of the two end points and an intermediate point on the arc.

Figure 4:
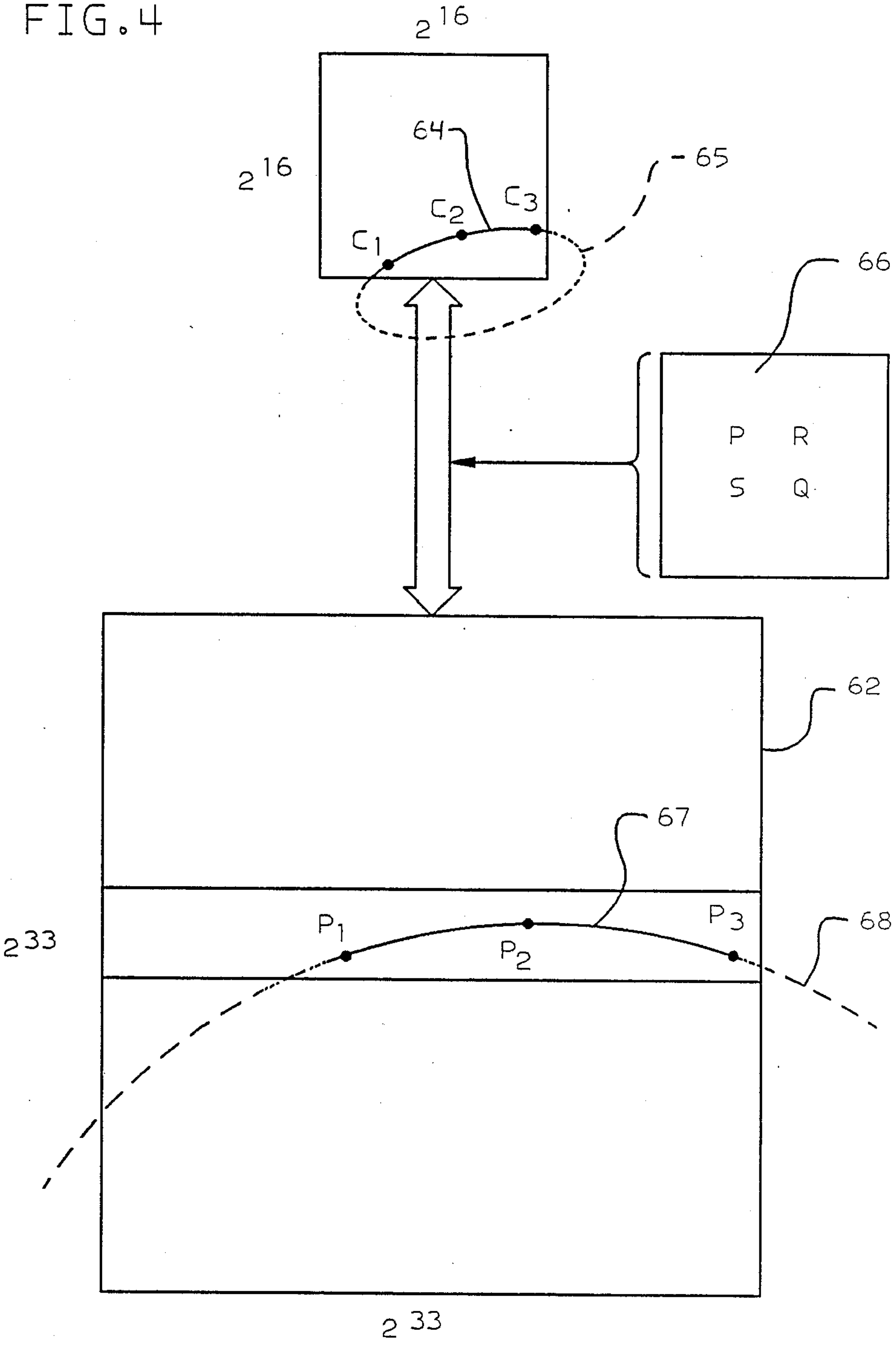
FIG. 4 is an illustration to explain how a generalized curve may be drawn using the principles behind the present invention.

FIG. 4 illustrates now an ellipse can be represented in this way. GOCA assumes real space to be a cube 60 with $2^{16}$ locations in each of the x, y, and z directions. In other words, 3 times 16 (i.e. 48) bits are needed to identify a location in real space. In order to transform points between real and mapped space a transformation matrix (termed a PQRS matrix) is employed. Elliptical space is also defined as a cube, but as a result of the matrix calculation it has $2^{33}$ locations on each side ($2^{16}*2^{16}+$ carry).

For reasons of ease of representation, only two-dimensional (x and y) real 60 and mapped 62 space is shown in FIG. 4. Within the real space 60, a curve 64, which forms part of an ellipse 65 is defined in terms of the two end points $C_1$ and $C_3$ and an intermediate point $C_2$ on the curve. In order to map the curve onto an arc of a circle, a PQRS matrix 68 is provided. The points $C_1$, $C_2$ and $C_3$ become the mapped points $P_1$, $P_2$ and $P_3$ in the mapped space after the inverse of the PQRS transformation. The points $P_1$ and $P_3$ form the two end points and the point $P_2$ forms the intermediate point on the arc 67 of a circle 68.

If the techniques described above for plotting an arc of a circle are then used to plot the arc 68, and the resulting point plots in mapped space are transformed back into real space using the PQRS transformation, the individual points on the curve 64 can be plotted in real space.

Clearly this technique can be employed for any general curve for which a transform is known which will allow the curve to be mapped onto an arc of a circle and vice versa.

Figure 5:
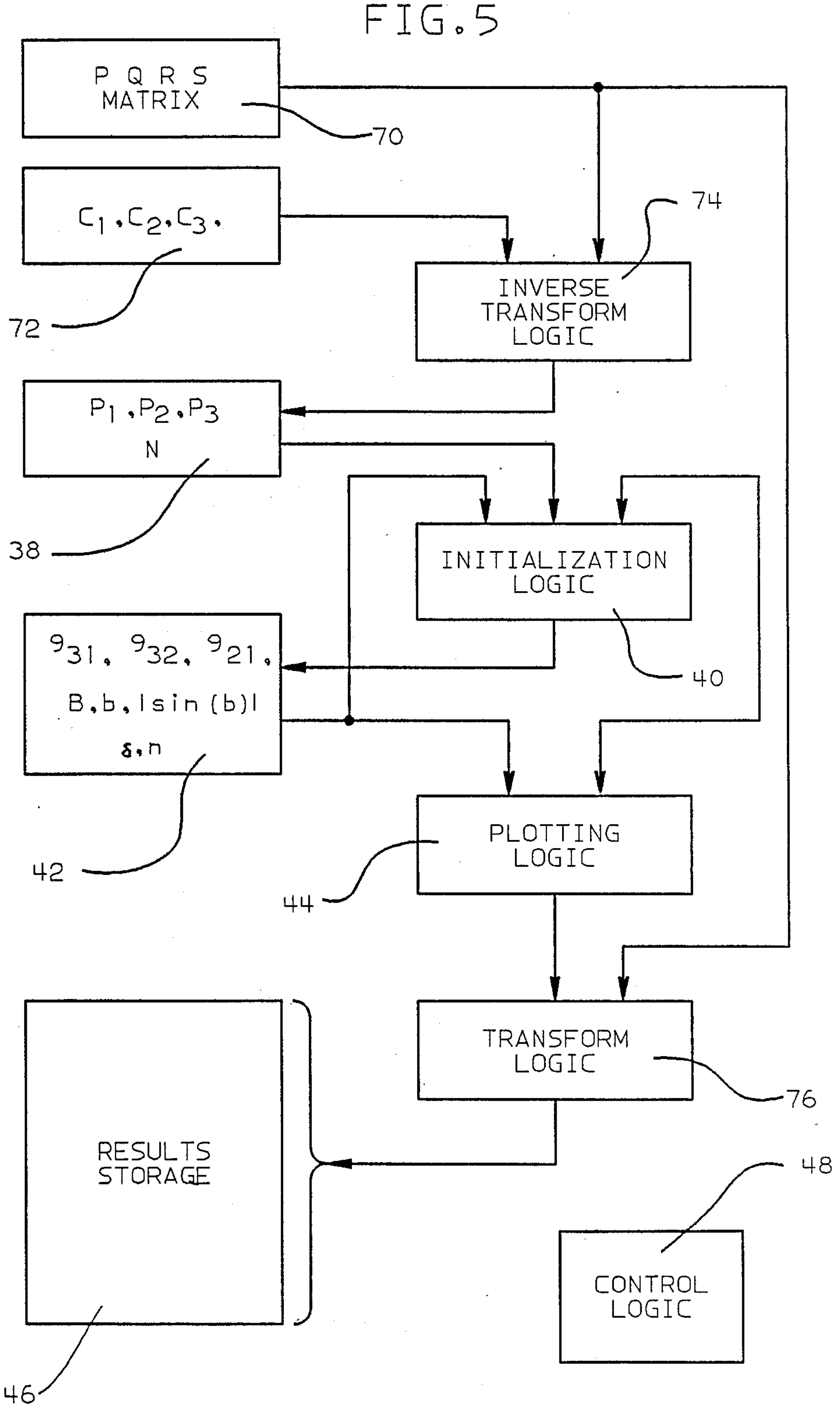
FIG. 5 is a schematic block diagram showing the logical structure of another particular embodiment of the present invention.

FIG. 5 is a schematic block diagram showing the logical structure of a curve generator forming a second particular embodiment of the present invention. This curve generator is capable of generating a curve such as the curve 64. The curve generator comprises PQRS matrix storage for storing the transform operator information for transforming data between real and mapped space. In addition it comprises initial input storage 72 for the storage of the three points $C_1$, $C_2$ and $C_3$ for the ellipse to be drawn in real space. The coordinates of the points on the ellipse are transformed into mapped space by the inverse transform logic 74 and are stored in the input storage 38 of the arc generator as the mapped points $P_1$, $P_2$ and $P_3$. These mapped points are then processed by the initialization logic 40 of the arc generator and are stored in the intermediate storage 42 as described above for the curve 10 with respect to FIG. 3. The intermediate values stored in the intermediate storage are then processed as explained for the plotting logic 44 of the arc generator using the equations 13/14 etc. As shown in FIG. 5, the results of the plotting logic (i.e. the plots of the circular arc), are not passed directly to the results storage 46, but are instead passed to transform logic 76 which uses the inverse of the transform used by the transform logic 74 to transform the plots of the circular arc in mapped space into corresponding plots on the curve 64 for storage in the results storage 46. It will be appreciated that the clipping function described for the plotting logic in FIG. 3 could be performed instead by the transform logic in the embodiment of FIG. 5. It will also be appreciated that the plotting and transform logic could be incorporated into one unit as the output of one feeds directly into the other. Alternatively, the transform and inverse transform logic could be combined as their input parameters are similar, and appropriate control provided by the control logic 48.

The advantage provided by the present invention are perhaps most apparent when the number of binary places of accuracy needed in the present invention is compared to that needed by prior approaches.

In the example of the GOCA 33 bit coordinate space, it can be shown that the prior techniques can require up to 81 binary places of accuracy in order to accurately calculate all the arcs that needed to be drawn. The present invention on the other hand allows curves to be plotted using at most 32 binary places of accuracy for the computation of the points on a circular arc, although 48 places are needed for the reverse transform into drawing, or real, space. Much of the computation can be performed in 16 places of accuracy. Mapping the resulting curve, or arc, points onto locations in real space (e.g. onto pixel positions) can be simply done by truncating or clipping the calculated values at the 16th most significant bit.

Figure 6:
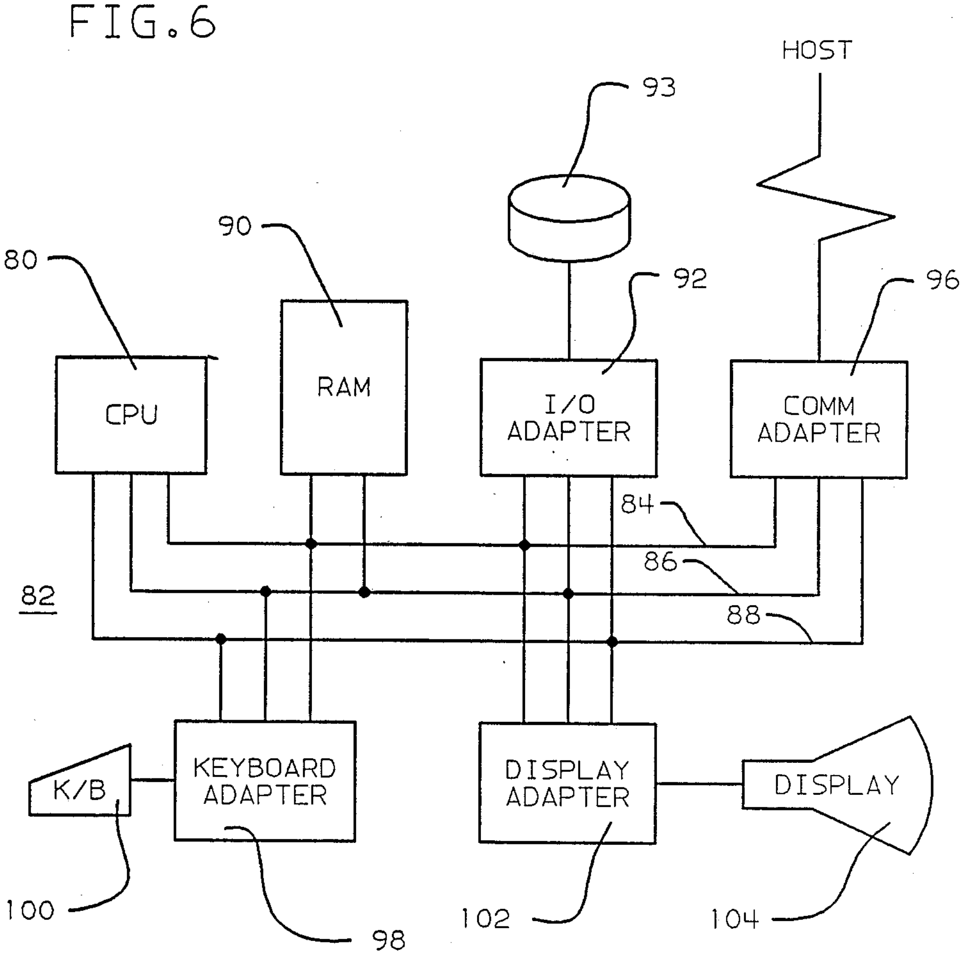
FIG. 6 is a schematic diagram of a workstation which can incorporate an embodiment of the present invention such as shown in FIG. 3 or 5.

FIG. 6 shows an overview of a workstation which can incorporate an embodiment of the present invention such as is shown in FIG. 3 or FIG. 5.

The workstation comprises a number of different systems units connected via a system bus 82. The system bus comprises a data bus 84, an address bus 86 and a control bus 88. Connected to the system bus are a microprocessor 80, random access memory 90, a keyboard adapter 98, a display adapter 102, an I/O adapter 92, and a communications adapter 96. The keyboard adapter is used to connect a keyboard 100 to the system bus. The display adapter connects the system bus to a display device 104. The I/O adapter likewise connects the system bus to other I/O devices such as disk units, and the communications adapter allows the workstation to be connected to and to communicate with an external processor or processors such as a host processor.

A curve generator incorporating an arc generator in accordance with the present invention is implemented in software in the workstation shown in FIG. 1. Control code for implementing the logic shown in FIGS. 3/5 is provided in the workstation storage 90 and the storage elements shown in FIGS. 3/5 are provided by configuring the workstation RAM. In the illustrated embodiment the display buffer is configured in RAM as well. A detailed listing of the code for implementing the logic and this storage elements shown in FIGS. 3/5 is not supplied with the description as the implementation of that logic is merely a matter of routine for the skilled person given the above description of the functions to be performed.

Although particular embodiments and a particular implementation of the present invention have been described herein, it will be appreciated that many modifications and additions are within the scope of the appended claims.

Instead of implementing the present invention in software, it will be appreciated, for example, that the present invention could equally be implemented with special purpose hardware logic, with or without the provision of special register for the intermediate storage of variables. The logic units shown in FIGS. 3 and 5 could, for example, be implemented using programmable logic arrays. Also, if the display buffer were instead included in the display adapter, the arc and/or curve generators could be incorporated in the display adapter as well in order to relieve the system processor of the task of plotting individual display points.

We claim:

1. A curve generator for a display system, the curve generator comprising arc generation means for generating an arc of a circle from data defining the locations of two end points and an intermediate point on the arc, wherein the arc generation means comprises initialization means for calculating the angle subtended between a first vector, from a first of the end points to the intermediate point, and a second vector, from the second of the end points to the intermediate point, and arc plotting means responsive to said initialization means for defining a succession of further vectors from said first end point and for calculating, for each further vectors, a point of intersection with a counterpart vector, from said second end point, with which said angle is subtended, whereby a succession of further points are plotted on the circular arc.

2. A curve generator as claimed in claim 1 wherein said arc plotting means defines each said further vector in terms of a vector angle $\delta_n = n\delta$, where n is stepped from 1 to N for each of a succession of N further vectors and wherein said arc plotting means calculates said point of intersection for each said further vector from the gradient of that further vector with respect to a reference direction and from a distance from said first end point along that further vector.

3. A curve generator as claimed in claim 2 wherein said initialization means also comprises means for computing the length of a third vector, from said first to said second end points, and wherein said plotting means calculates the gradient of a said further vector as:

$$\pi - \delta_n - b + g_{31},$$

and calculates said distance from said first end point along that further vector as:

$$\frac{B|\sin(\delta_n)|}{|\sin(b)|},$$

where b is said angle subtended between said first and second vectors, $g_{31}$ is the gradient of the third vector, and B is said distance between said first and second end points.

4. A curve generator according to claim 1, 2 or 3, wherein the curve generator is for generating a curve from data defining the locations of two end points and an intermediate point on the curve in reference space and a transform operator for mapping the curve onto the arc of a circle in mapped space, wherein the curve generator additionally comprises transform logic for transforming data representative of the curve between reference and mapped space using the transform operator or the inverse of said transform as appropriate, and wherein the arc generation means is for generating an arc of a circle in mapped space from the locations of the two end points and the intermediate point on the curve when mapped into mapped space.

5. A display system comprising a curve generator, the curve generator comprising arc generation means for generating an arc of a circle from data defining the locations of two end points and an intermediate point on the arc, wherein the arc generation means comprises initialization means for calculating the angle subtended between a first vector, from a first of the end points to the intermediate point, and a second vector, from the second of the end points to the intermediate point, and arc plotting means for defining a succession of further vectors from said first end point and for calculating, for each further vectors, a point of intersection with a counterpart vector, from said second end point, with which said angle is subtended, whereby a succession of further points are plotted on the circular arc.

6. A method of generating an arc of a circle in a display system comprising processing and memory means from data defining the locations of two end points and an intermediate point on the arc comprising the steps of:

(a) calculating the angle subtended between a first vector, from a first of the end points to the intermediate point, and a second vector, from the second of the end points to the intermediate point;

(b) storing the calculated angle in said memory means;

(c) defining a further vector from said first end point;

(d) calculating, for said further vector, a point of intersection with a counterpart vector, from the second end point, with which said further vector subtends said calculated angle; and (e) repeating steps (c) and (d) for additional said further vectors from said first end point whereby a succession of further points are plotted on the circular arc.

7. A method of generating a curve in a display system from data defining the locations of two end points and an intermediate point on the curve in reference space and a transform operator for mapping the curve onto the arc of a circle in mapped space, said method comprising the steps of:

(a) mapping the three points from reference space into mapped space;

(b) calculating the angle subtended between a first vector, from a first of the mapped end points to the mapped intermediate point, and a second vector, from the second of the mapped end points to the mapped intermediate point;

(c) storing the calculated angle in a storage means;

(d) defining a further vector from said first mapped end point;

(e) calculating, for said further vector, a point of intersection with a counterpart vector, from the second mapped end point, with which said further vector subtends said calculated angle;

(f) transforming the point of intersection from mapped space into reference space using the transform operator; and (g) repeating steps (d), (e) and (f) for additional said further vectors whereby a succession of further points are plotted on the curve in reference space.

* * * * *